(12) United States Patent
Cho et al.

(10) Patent No.: US 8,509,149 B2
(45) Date of Patent: Aug. 13, 2013

(54) METHOD AND APPARATUS OF TRANSMITTING AND RECEIVING SYSTEM INFORMATION IN A WIRELESS SYSTEM

(75) Inventors: Hee Jeong Cho, Anyang-si (KR); Ki Seon Ryu, Anyang-si (KR); Jin Soo Choi, Anyang-si (KR); Yong Ho Kim, Anyang-si (KR); Young Soo Yuk, Anyang-si (KR)

(73) Assignee: LG Electronics Inc., Seoul (KR)

(*) Notice: Subject to any disclaimer, the term of this patent is extended or adjusted under 35 U.S.C. 154(b) by 151 days.

(21) Appl. No.: 12/984,567

(22) Filed: Jan. 4, 2011

(65) Prior Publication Data

US 2011/0188450 A1 Aug. 4, 2011

Related U.S. Application Data

(60) Provisional application No. 61/302,462, filed on Feb. 8, 2010, provisional application No. 61/294,786, filed on Jan. 13, 2010, provisional application No. 61/292,798, filed on Jan. 6, 2010, provisional application No. 61/292,136, filed on Jan. 4, 2010.

(30) Foreign Application Priority Data

Dec. 28, 2010 (KR) .................. 10-2010-0136511

(51) Int. Cl.
*H04W 4/00* (2009.01)
(52) U.S. Cl.
USPC ....................................... 370/328

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| 2009/0052387 A1* | 2/2009 | Lee et al. ...................... 370/329 |
| 2010/0002631 A1* | 1/2010 | Cho et al. ..................... 370/328 |
| 2012/0207073 A1* | 8/2012 | Kim et al. ..................... 370/311 |

FOREIGN PATENT DOCUMENTS

WO 2009/038367 3/2009

* cited by examiner

*Primary Examiner* — Jung-Jen Liu
(74) *Attorney, Agent, or Firm* — Lee, Hong, Degerman, Kang & Waimey

(57) ABSTRACT

A method and apparatus for transmitting and receiving system information in a wireless communication system are disclosed. A method for receiving system information by a mobile station (MS) of a wireless communication system includes receiving a secondary superframe header (S-SFH) change cycle from a base station (BS), and receiving a primary superframe header information element (P-SFH IE) including a first field indicating a change count of a plurality of secondary superframe header subpacket information elements (S-SFH SP IEs) from the base station (BS). Once each of the plurality of S-SFH SP IEs is changed, each of the plurality of S-SFH SP IEs remains unchanged during one or more S-SFH change cycles.

8 Claims, 16 Drawing Sheets

FIG. 3

| | SFN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|
| | CC | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| P-SFH IE | CB | 000 | 000 | 000 | 000 | 000 | 000 | 000 | 000 | 000 | 000 | 000 | 000 | 000 | 000 | 000 | 000 | 001 | 001 | 001 | 001 | 001 | 001 | 001 | 001 | 001 | 001 | 001 | 001 | 001 | 001 | 001 | 001 | 001 | 001 | 001 | 001 | 001 | 001 |
| | SI | 3 | 2 | 1 | 0 | 2 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 0 | 0 | 0 | 0 | 0 | 0 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| Applied S-SFH count | | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |

FIG. 4

| | SFN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|
| P-SFHIE | CC | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | CB | 000 | 000 | 000 | 000 | 000 | 000 | 000 | 000 | 000 | 000 | 000 | 000 | 000 | 000 | 000 | 000 | 011 | 011 | 011 | 011 | 011 | 011 | 011 | 011 | 011 | 011 | 011 | 011 | 011 | 011 | 011 | 011 | 011 | 011 | 011 | 011 | 011 | 011 |
| | SI | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 0 | 0 | 0 | 0 | 0 | 0 | 0 | 0 | 0 | 1 | 1 | 1 | 1 | 0 | 1 |
| Applied S-SFH count | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 |

FIG. 5

| | | SFN | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|---|---|---|---|---|---|---|---|---|---|---|---|---|---|---|
| P-SFH IE | | CC | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 |
| | | CB | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 001 | 001 | 001 | 001 | 001 | 001 |
| | | SI | 3 | 1 | 2 | 1 | 0 | 1 | 2 | 3 | 1 | 2 | 1 | 0 | 1 | 2 | 1 | 2 | 3 | 1 | 2 | 1 | 0 | 1 | 2 | 1 | 2 | 3 | 1 | 2 | 1 | 0 | 1 | 2 | 3 | 1 | 2 | 1 | 0 | 1 |
| | | Flag | 10 | 10 | 10 | 10 | 10 | 10 | 10 | 10 | 10 | 10 | 10 | 10 | 10 | 10 | 10 | 10 | 00 | 00 | 00 | 00 | 00 | 00 | 00 | 00 | 00 | 00 | 00 | 00 | 00 | 00 | 00 | 00 | 01 | 01 | 01 | 01 | 01 | 01 |
| Applied S-SFH count | | | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 6

| | SFN | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|---|---|---|---|---|---|---|---|---|---|---|---|---|---|---|---|---|
| P-SFH IE | CC | 0 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 3 | 3 | 3 | 3 | 3 | 3 |
| | CB | 000 | 001 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 010 | 100 | 100 | 100 | 100 | 100 | 100 |
| | SI | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 00 | 10 | 10 | 10 | 10 | 10 | 10 | 10 | 10 | 10 | 10 | 10 | 10 | 10 | 10 | 10 | 00 | 00 | 00 | 00 | 00 | 00 | 00 | 00 | 00 | 00 | 00 | 00 | 00 | 00 | 00 | 00 | 01 | 01 | 01 | 01 | 01 | 01 |
| Applied S-SFH count | | 0 | 0 | 0 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

FIG. 7

| | SFN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|
| | CC | 0 | 0 | 0 | 0 | 0 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 3 | 3 | 3 | 3 | 3 | 3 |
| P-SFH IE | CB | 000 | 000 | 000 | 000 | 000 | 001 | 001 | 001 | 001 | 001 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 100 | 100 | 100 | 100 | 100 | 100 |
| | SI | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 00 | 00 | 00 | 00 | 00 | 10 | 10 | 10 | 10 | 10 | 10 | 10 | 10 | 10 | 10 | 10 | 00 | 00 | 00 | 00 | 00 | 00 | 00 | 00 | 00 | 00 | 00 | 00 | 00 | 00 | 00 | 00 | 01 | 01 | 01 | 01 | 01 | 01 |
| Applied S-SFH count | | 0 | 0 | 0 | 0 | 0 | 0 | 0 | 0 | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

| | SFN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|
| P-SFH IE | CC | 0 | 0 | 0 | 0 | 0 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| | CB | 000 | 000 | 000 | 000 | 000 | 001 | 001 | 001 | 001 | 001 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 |
| | SI | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 00 | 00 | 00 | 00 | 00 | 01 | 01 | 01 | 00 | 01 | 01 | 01 | 01 | 01 | 01 | 10 | 01 | 01 | 01 | 00 | 01 | 01 | 01 | 01 | 01 | 01 | 10 | 01 | 00 | 01 | 01 | 01 | 00 | 00 | 00 | 00 | 00 | 00 |
| | Applied S-SFH count | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

FIG. 10

| | SFN | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|---|---|---|---|---|---|---|---|---|---|---|---|---|---|---|---|---|---|---|---|---|
| | CC | 0 | 0 | 0 | 0 | 0 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| P-SFH IE | CB | 000 | 000 | 000 | 000 | 000 | 001 | 001 | 001 | 001 | 001 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 | 011 |
| | SI | 3 | 1 | 2 | 1 | 0 | 1 | 2 | 1 | 3 | 1 | 2 | 1 | 0 | 1 | 2 | 3 | 1 | 2 | 1 | 0 | 1 | 2 | 1 | 3 | 1 | 2 | 1 | 0 | 1 | 2 | 1 | 3 | 1 | 2 | 1 | 0 | 1 |
| | Flag | 00 | 00 | 00 | 00 | 00 | 01 | 01 | 01 | 00 | 00 | 00 | 01 | 01 | 01 | 00 | 00 | 00 | 00 | 00 | 00 | 00 | 00 | 00 | 00 | 00 | 00 | 00 | 00 | 00 | 00 | 00 | 00 | 00 | 00 | 00 | 00 | 00 |
| Applied S-SFH count | | 0 | 0 | 0 | 0 | 0 | 0 | 0 | 0 | 1 | 1 | 1 | 1 | 1 | 1 | 1 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

METHOD AND APPARATUS OF TRANSMITTING AND RECEIVING SYSTEM INFORMATION IN A WIRELESS SYSTEM

CROSS REFERENCE TO RELATED APPLICATIONS

Pursuant to 35 U.S.C. §119, this application claims the benefit of earlier filing date and right of priority to Korean Application No. 10-2010-0136511, filed on Dec. 28, 2010, and also claims the benefit of U.S. Provisional Application Ser. Nos. 61/302,462, filed on Feb. 8, 2010, 61/294,786, filed on Jan. 13, 2010, 61/292,798, filed on Jan. 6, 2010, and 61/292,136, filed on Jan. 4, 2010, the contents of all of which are hereby incorporated by reference herein in their entirety.

BACKGROUND OF THE INVENTION

1. Field of the Invention

The present invention relates to a wireless communication system, and more particularly to a method and apparatus for transmitting and receiving system information in a wireless communication system.

2. Discussion of the Related Art

A brief description will be given below of a super frame header (SFH).

A base station (BS) transmits system information to mobile stations (MSs) through an SFH. The SFH is located in a first subframe contained in one superframe. The SFH is divided into a primary SFH (P-SFH) and a secondary SFH (S-SFH).

Table 1 shows a P-SFH Information Element (IE).

The P-SFH IE is transmitted at every superframe, and includes 4-bit Least Significant Bit (LSB) information of the SFN and information associated with the S-SFH IE. The S-SFH IE—associated information includes an S-SFH change count that indicates version information of a currently transmitted S-SFH; S-SFH scheduling information that indicates which secondary super frame header subpacket information element (S-SFH SP IE) is included in the corresponding superframe; S-SFH size that indicates the number of LRUs allocated for S-SFH transmission; S-SFH number of repetition that indicates a transmission format of the S-SFH; and S-SFH SP change bitmap that indicates which S-SFH SP IE is changed. The size of the S-SFH SP change bitmap field is identical to a total number of S-SFH SP IEs.

Table 2 shows the S-SFH IE format. The S-SFH transmits actual system information. The system parameter and system configuration information transmitted through the S-SFH are classified into S-SFH SP1 IE, S-SFH SP2 IE, and S-SFH SP3 IE. S-SFH SP1 IE includes network reentry information. S-SFH SP2 IE includes initial network entry and network discovery information. S-SFH SP3 IE includes the remaining requisite system information for network entry or network reentry.

TABLE 1

| Syntax | Size (bit) | Notes |
|---|---|---|
| P-SFH IE format ( ) { | | |
|   LSB of superframe number | 4 | Part of superframe number |
|   S-SFH change count | 4 | Indicates the value of S-SFH change count associated with the S-SFH SPx IE(s) transmitted in this S-SFH change cycle |
|   S-SFH size extension | 2 | 0b00: $Size_{SPx,extension} = 0$<br>0b01: $Size_{SPx,extension} = 8$<br>0b10: $Size_{SPx,extension} = 16$<br>0b11: $Size_{SPx,extension} = 24$ |
|   Number of repetitions for S-SFH ($N_{Rep,S-SFH}$) | 2 | Indicate the number of repetitions used for S-SFH transmission.<br>0b00: reserved<br>0b01: 6<br>0b10: 3<br>0b11: 1 |
|   S-SFH scheduling information | 2 | Indicates which S-SFH SP IE is included in S-SFH at this superframe<br>0b00: S-SFH SP1 IE<br>0b01: S-SFH SP2 IE<br>0b10: S-SFH SP3 IE<br>0b11: no S-SFH |
|   S-SFH SP change bitmap | 3 | Indicates the change in the content of S-SFH SPx IE(s) between current SFH and previous SFH associated with the S-SFH change count.<br>If bit#0 (LSB) = 1, change in S-SFH SP1 IE. Otherwise no change in SP1 IE.<br>If bit#1 = 1, change in S-SFH SP2 IE. Otherwise no change in SP2 IE.<br>If bit#2 (MSB) = 1, change in S-SFH SP3 IE. Otherwise no change in SP3 IE. |
|   S-SFH application hold indicator | 1 | Indicate the S-SFH change count value used to determine the S-SFH SPx IE content to apply in this superframe:<br>0b0: Use S-SFH SPx IE content associated with the current S-SFH change count<br>0b1: Use S-SFH SPx IE content associated with (the current S-SFH change count − 1) modulo 16 |
|   Reserved | 3 | The reserved bits are for future extension. |

TABLE 2

| Syntax | Size (bit) | Notes |
|---|---|---|
| S-SFH IE format ( ) {<br>  if (S-SFH Scheduling information == 0b00)<br>  {<br>    S-SFH SP1 IE ( ) | $Size_{SP1}$ | Includes S-SFH SP1 IE in Table 832.<br>The size of S-SFH SP1 IE depends on FFT size.<br>For 2048 FFT,<br>$Size_{SP1, default} = 96$<br>For 1024 FFT,<br>$Size_{SP1, default} = 90$<br>For 512 FFT,<br>$Size_{SP1, default} = 84$ |
|   }<br>  else if (S-SFH Scheduling information ==<br>  0b01) {<br>    S-SFH SP2 IE ( ) | $Size_{SP2}$ | Includes S-SFH SP2 IE in Table 833.<br>The size of S-SFH SP2 IE depends on FFT size.<br>For 2048 FFT,<br>$Size_{SP2, default} = 96$<br>For 1024 FFT,<br>$Size_{SP2, default} = 90$<br>For 512 FFT,<br>$Size_{SP2, default} = 86$ |
|   }<br>  else if (S-SFH Scheduling information ==<br>  0b10) {<br>    S-SFH SP3 IE ( ) | $Size_{SP3}$ | Includes S-SFH SP3 IE in Table 834.<br>$Size_{SP3, default} = 77$ |
|   }<br>} | | |

S-SFH SP1 IE, S-SFH SP2 IE and S-SFH SP3 IE having different periodicities are transmitted at different times. Table 3 shows transmission periods of S-SFH SP1 IE, S-SFH SP2 IE and S-SFH SP3 IE. The transmission periodicities of S-SFH SP1 IE, S-SFH SP2 IE and S-SFH SP3 IE are signaled through the S-SFH SP3 IE.

TABLE 3

| SP scheduling periodicity information | Transmission periodicity of S-SFH SP1 | Transmission periodicity of S-SFH SP2 | Transmission periodicity of S-SFH SP3 |
|---|---|---|---|
| 0000 | 40 ms | 80 ms | 160 ms |
| 0001 | 40 ms | 80 ms | 320 ms |
| 0010-1111: reserved | | | |

A method for controlling a mobile station (MS) to update S-SFH SP IE (secondary super frame header subpacket information element) information will hereinafter be described in detail.

The mobile station (MS) receives P-SFH IE to confirm the S-SFH change count field. The base station (BS) increases a value assigned to the S-SFH change count field by one whenever the S-SFH IE information is updated (changed).

If the value of the S-SFH change count field is different from a value assigned to the MS, the MS determines that the S-SFH SP IE has been updated (changed), and recognizes the S-SFH SP change bitmap of the P-SFH IE such that it can confirm which S-SFH SP has been updated (changed).

In addition, P-SFH IE confirms the S-SFH scheduling information field to recognize which S-SFH SP IE is transmitted through a current superframe. When transmitting the S-SFH SP IE to be updated (stored and updated) in the current SFH, the corresponding S-SFH SP IE is confirmed and updated (stored and updated). In addition, in the case where the S-SFH SP IE to be updated (stored and updated) is not transmitted through the current SFH, the S-SFH SP IE is received at the next period in which the S-SFH SP IE to be updated (stored and updated) is transmitted, such that the received SFH SP IE is updated (stored and updated).

According to the conventional art, the MS must decode the P0SFH at every superframe, confirm the S-SFH change count, and confirm whether the S-SFH SP IEs are changed, resulting in an increase in power consumption of the MS.

Next, a sleep mode operation according to the conventional art will hereinafter be described with reference to FIG. 1. While a mobile station (MS) communicates with a base station (BS) in a normal mode or an active mode, if there is no more traffic to be transmitted/received to/from the BS, the MS transmits a sleep request (hereinafter referred to as AAI_SLP-REQ) message requesting that the BS transition to a sleep mode. In response to the AAI_SLP-REQ message, the BS transmits a sleep response (hereinafter referred to as AAI_SLP-RSP) message to the MS. The MS having received the AAI_SLP-RSP message transitions to sleep mode using sleep parameters (such as a sleep cycle, a listening window, etc.) contained in the AAI_SLP-RSP message. In addition, the BS transmits an unsolicited AAI_SLP-RSP message to the MS such that the MS may transition to sleep mode.

FIG. 1 is a conceptual diagram illustrating a sleep mode operation of the MS according to the conventional art. Referring to FIG. 1, after the MS transitions from normal mode to sleep mode, an initial sleep cycle is applied to the MS such that the MS operates in the sleep mode. Upon completion of the transition to the sleep mode, a first sleep cycle includes only a sleep window.

From a second sleep cycle located after a first sleep cycle, the MS operates in the sleep mode using the sleep cycle including both the listening window and the sleep window. If the MS receives a traffic indication (TRF-IND) message including a negative indication message during the listening window, the MS detects the absence of downlink (DL) transmission traffic, and doubles a current sleep cycle. After the doubled sleep cycle ends, if the MS receives a TRF-IND message including a positive indication message during a listening window of the next sleep cycle, the MS resets a current sleep cycle to an initial sleep cycle.

The MS in the sleep mode has to include the latest system information transmitted through the SFH such that it can freely communicate with the BS using the latest system information. However, if a frame for P-SFH transmission is present in a sleep window of the MS, the MS is unable to receive the P-SFH.

In accordance with the above-mentioned conventional art, the MS needs to decode P-SFH at every superframe so as to determine whether S-SFH SP IEs are changed, resulting in an increase in MS power consumption. In addition, in the case of the MS operating in the sleep mode, if a frame for S-SFH transmission is present in the MS sleep window, the MS is unable to receive the P-SFH.

SUMMARY OF THE INVENTION

Accordingly, the present invention is directed to an apparatus and method for transmitting and receiving a demodulation reference signal (RS) that substantially obviate one or more problems due to limitations and disadvantages of the related art.

An object of the present invention devised to solve the problem lies on a method for transmitting and receiving system information so as to reduce power consumption of a mobile station (MS).

Another object of the present invention devised to solve the problem lies on a method for transmitting and receiving system information so as to allow an MS operating in a sleep mode to effectively receive system information.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

The object of the present invention can be achieved by providing a method for receiving system information by a mobile station (MS) of a wireless communication system, the method including receiving a secondary superframe header (S-SFH) change cycle from a base station (BS); and receiving a primary superframe header information element (P-SFH IE) including a first field indicating a change count of a plurality of secondary superframe header subpacket information elements (S-SFH SP IEs) from the base station (BS), wherein, once each of the plurality of S-SFH SP IEs is changed, each of the plurality of S-SFH SP IEs remains unchanged during one or more S-SFH change cycle periods.

A value of the first field may be changed only in a superframe satisfying that a remainder obtained when a superframe number (SFN) of the superframe is divided by the S-SFH change cycle is a predetermined number.

The S-SFH change cycle may be indicated in one of the S-SFH SP IEs.

The method may further include receiving at least one S-SFH SP IE among the plurality of S-SFH SP IEs, and updating the received S-SFH SP IE if a value of the first field is different from an S-SFH change count stored in the mobile station (MS).

The receiving at least one s-SFH SP IE may include receiving only one or more S-SFH SP IEs whose bit in an S-SFH SP change bitmap is set to 1 and updating the received one or more S-SFH SP IEs if a difference between the value of the first field and the S-SFH change count stored in the mobile station (MS) is 1, wherein the S-SFH SP change bitmap indicates whether each of the plurality of P-SFH SP IEs is changed.

The receiving at least one S-SFH SP IE may include receiving and updating all of the plurality of S-SFH SP IEs if a difference between the value of the first field and the S-SFH change count stored in the mobile station (MS) is greater than 1.

The method may further include applying contents of the at least one S-SFH SP IE simultaneously at the latest superframe among superframes immediately following after each of the at least one S-SFH SP IE is regularly transmitted a predetermined number of times.

The P-SFH IE may further include a second field indicating S-SFH SP IEs applied in a superframe in which the P-SFH IE is transmitted.

In another aspect of the present invention, provided herein is a method for transmitting system information by a base station (BS) of a wireless communication system, the method including transmitting a secondary superframe header (S-SFH) change cycle to a mobile station (MS), and transmitting a primary superframe header information element (P-SFH IE) including a first field indicating a change count of a plurality of secondary superframe header subpacket information elements (S-SFH SP IEs) to the mobile station (MS), wherein, once each of the plurality of S-SFH SP IEs is changed, each of the plurality of S-SFH SP IEs remains unchanged during one or more S-SFH change cycle periods.

In another aspect of the present invention, provided herein is a mobile station (MS) for use in a wireless communication system, the mobile station (MS) including a reception (Rx) module for receiving a secondary superframe header (S-SFH) change cycle from a base station (BS), and receiving a primary superframe header information element (P-SFH IE) that includes a first field indicating a change count of a plurality of superframe header subpacket information elements (S-SFH SP IEs) from the base station (BS), wherein, once each of the plurality of S-SFH SP IEs is changed once, each of the plurality of S-SFH SP IEs remains unchanged during one or more S-SFH change cycle periods.

In another aspect of the present invention, provided herein is a base station (BS) for use in a wireless communication system, the base station (BS) including a transmission (Tx) module for transmitting a secondary superframe header (S-SFH) change cycle to a mobile station (MS), and transmitting a primary superframe header information element (P-SFH IE) that includes a first field indicating a change count of a plurality of secondary superframe header subpacket information elements (S-SFH SP IEs) to the mobile station (MS), wherein, once each of the plurality of S-SFH SP IEs is changed, each of the plurality of S-SFH SP IEs remains unchanged during one or more S-SFH change cycle periods.

In another aspect of the present invention, provided herein is a mobile station (MS) for use in a wireless communication system, the mobile station (MS) including: a central processing unit (CPU) for controlling overall operations of the mobile station (MS); a memory for storing information related to communication with a base station (BS); and a communication module for controlling communication with the base station (BS), wherein the communication module includes a reception (Rx) module, the reception (Rx) module receiving a secondary superframe header (S-SFH) change cycle from a base station (BS), and receiving a primary superframe header information element (P-SFH IE) that includes a first field indicating a change count of a plurality of secondary superframe header subpacket information elements (S-SFH SP IEs) from the base station (BS), wherein, once each of the plurality of S-SFH SP IEs is changed, each of the plurality of S-SFH SP IEs remains unchanged during one or more S-SFH change cycle periods.

In another aspect of the present invention, provided herein is a base station (BS) for use in a wireless communication system, the base station (BS) including: a central processing unit (CPU) for controlling overall operations of the base station (BS); a memory for storing information related to communication; and a communication module for controlling communication, wherein the communication module includes a transmission (Tx) module, the transmission (Tx) module transmitting a secondary superframe header (S-SFH) change cycle to a mobile station (MS), and transmitting a primary superframe header information element (P-SFH IE) that includes a first field indicating a change count of a plurality of secondary superframe header subpacket information elements (S-SFH SP IEs) to the mobile station (MS), wherein, once each of the plurality of S-SFH SP IEs is changed, each of the plurality of S-SFH SP IEs remains unchanged during one or more S-SFH change cycle periods.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 3 shows application time points when one S-SFH SP IE is changed in one transmission time interval according to the present invention.

FIG. 4 shows application time points when several S-SFH SP IEs are changed in one transmission time interval.

FIG. 5 shows application time points according to a second method.

FIG. 6 shows exemplary application time points according to a third method.

FIG. 7 shows another example of an application time point according to a third method.

FIG. 8 shows application time points according to a fourth method.

FIG. 9 shows one example of an application time point according to a fifth method.

FIG. 10 shows another example of an application time point according to a fifth method.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3rd Generation Partnership Project 2 (3GPP2) 802.16 system, but the present invention is not limited thereto and the remaining parts of the present invention other than unique characteristics of the 3GPP2 802.16 system are applicable to other mobile communication systems.

In some cases, in order to prevent ambiguity of the concepts of the present invention, conventional devices or apparatuses well known to those skilled in the art will be omitted and denoted in the form of a block diagram on the basis of the important functions of the present invention. Wherever possible, the same reference numbers will be used throughout the drawings to refer to the same or like parts.

In the following description, "terminal" may refer to a mobile or fixed user equipment (UE), for example, a user equipment (UE), a mobile station (MS) and the like. Also, "base station" (BS) may refer to an arbitrary node of a network end which communicates with the above terminal, and may include a Node B (Node-B), an eNode B (eNode-B) and the like.

A method for transmitting and receiving system information according to the embodiments of the present invention will hereinafter be described with reference to the accompanying drawings.

According to the embodiments of the present invention, whenever it is necessary for a mobile station (MS) to perform a validity check of each S-SFH SP IE (secondary super frame header subpacket information element) stored in the MS, the MS decodes a P-SFH IE (primary super frame header information element) to check whether each S-SFH SP IE is changed.

Figure 1:
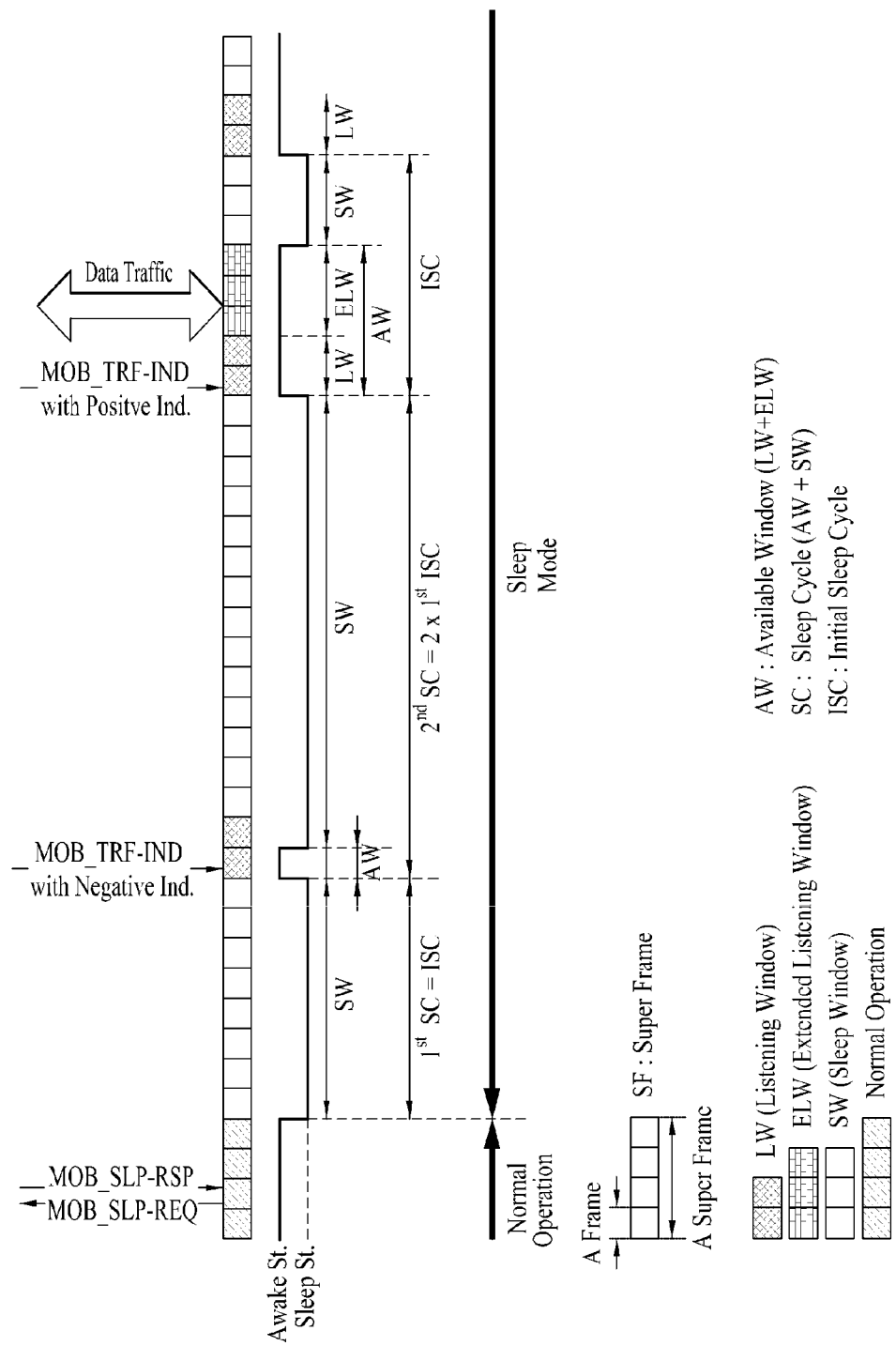
FIG. 1 is a conceptual diagram illustrating a sleep mode operation of a mobile station (MS) according to the conventional art.
Figure 2:
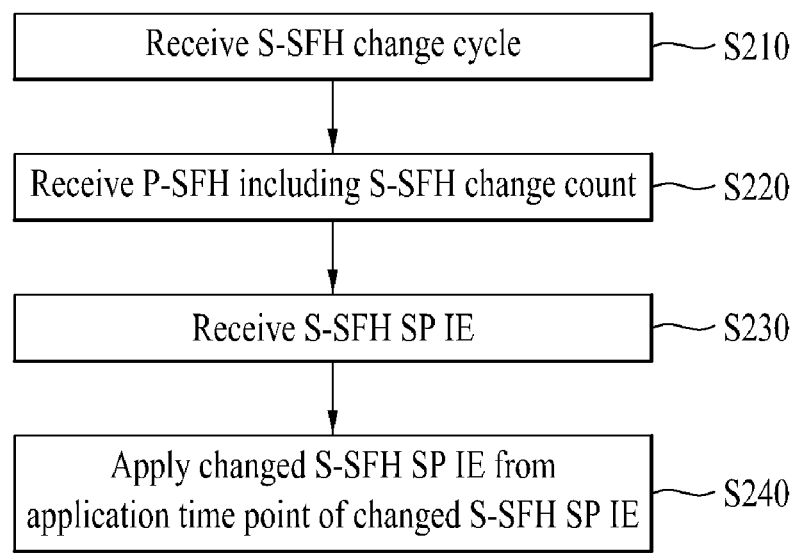
FIG. 2 is a flowchart illustrating a method for receiving system information of a mobile station (MS) according to an exemplary embodiment of the present invention.

FIG. 2 is a flowchart illustrating a method for receiving system information of a mobile station (MS) according to an exemplary embodiment of the present invention.

Referring to FIG. 2, the MS receives an S-SFH change cycle from the BS at step S210. In this case, the MS may receive the S-SFH change cycle through the S-SFH SP3 IE.

The S-SFH change cycle is indicative of a minimum period in which S-SFH remains unchanged. Each of the S-SFH SP IEs may be changed only once during the S-SFH change cycle. That is, provided that each S-SFH SP IE is changed only once, it remains unchanged during one or more S-SFH change cycles. The S-SFH change cycle may be established in all of the S-SFH SP IEs, or may also be established in each S-SFH SP IE.

The S-SFH change time may be represented in either a time unit (e.g., ms) or a superframe unit. If the S-SFH change cycle is not established in each S-SFH SP IE, the S-SFH change cycle may be represented by a total number of S-SFH SP IEs that are transmitted during the S-SFH change cycle.

In the case where the S-SFH change cycle is established for the entirety of several S-SFH SP IEs, the S-SFH change count information indicating the S-SFH version contained in the primary superframe header information element (P-SFH IE) can be increased only once during the S-SFH change cycle. In this case, the S-SFH change count information may be increased only in specific superframes that are dependent upon a change cycle and a superframe number (SFN). For example, if the S-SFH change cycle is established in units of a superframe, the S-SFH change count can be increased only in a superframe having an SFN in which SFN modulo S-SFH change cycle is equal to a specific value. In this case, the specific number may be set to zero. If the S-SFH change cycle is 32, the S-SFH change count may be increased only in a superframe in which the SFN is a multiple of 32.

In addition, the changed S-SFH SP IE is transmitted through some superframes scheduled for the changed S-SFH SP IE, from among a first superframe where the S-SFH change count is changed and other superframes subsequent to the first superframe.

Next, the case in which the S-SFH change cycle is established for each S-SFH IE will hereinafter be described in detail. A base station (BS) may change the corresponding S-SFH SP IE at a specific time point that is decided using the S-SFH change cycle and the SFN that belong to each S-SFH SP IE. That is, the S-SFH SP IE may be changed in a superframe that satisfies 'f(SFN, S-SFH change cycle)=x'. In this case, 'x' may be preset to a specific value, and may be transmitted through the S-SFH. In addition, 'x' must be lower than "Transmission Period of Corresponding S-SFH SP IE/Period of one superframe". For example, provided that the S-SFH SP1 IE transmission period is 40 ms and one superframe period is 20 ms, 'x' must be lower than '2'. For convenience of description and better understanding of the present invention, it is assumed that one superframe interval is 20 ms in the following description.

In the case where the S-SFH change cycle is represented by a total number of S-SFH SP IEs that are transmitted during the S-SFH change cycle, the S-SFH SP IE may be changed only in a superframe having an SFN where SFN mod (S-SFH change cycle*S-SFH SP IE transmission period/20) is equal to a specific value. For example, provided that the S-SFH SP1 IE transmission period is 40 ms, the change cycle is 3, and the S-SFH SP1 IE is changed every superframe that satisfies SFN mod (S-SFH change cycle*S-SFH SP IE transmission period/20 ms)=1, S-SFH SP1 IE may be changed in a superframe having an SFN of 1, 7, 13 or 19.

If the S-SFH change cycle is represented by a time unit (ms), the S-SFH SP IE may be changed only in a superframe where SFN mod (S-SFH change cycle/20 ms) is equal to a specific value. In this case, it is necessary for the S-SFH change cycle to be an integer multiple of the corresponding S-SFH SP IE transmission period. For example, provided that the S-SFH SP1 IE change cycle is 80 ms and S-SFH SP1 IE is changed at every superframe that satisfies SFN mod (S-SFH change cycle/20 ms)=1, S-SFH SP1 IE may be changed in a superframe having an SFN of 1, 5, 9 or 13.

If the S-SFH change cycle is represented in units of a superframe, the S-SFH SP IE may be changed only in a superframe having an SFN where SFN mod S-SFH change cycle is equal to a specific value. In this case, it is necessary for the S-SFH change cycle to be an integer multiple of a specific value in which the corresponding S-SFH SP IE transmission period is represented by the number of superframes. For example, provided that the S-SFH change cycle of the S-SFH SP1 IE is 4, and the S-SFH SP1 IE is changed at every superframe that satisfies 'SFN mod S-SFH change cycle=1', S-SFH SP1 IE may be changed in a superframe having an SFN of 1, 5, 9 or 13.

Referring back to FIG. 2, a mobile station (MS) receives a P-SFH IE having the S-SFH change count field at step S220. The S-SFH change count field may indicate the number of change times of S-SFH SP IEs that are transmitted during the current S-SFH change cycle. That is, the S-SFH change count field may indicate version information of the S-SFH SP IEs. If at least one of the S-SFH SP IEs is changed, the value of the S-SFH change count is increased.

In this case, since the MS has already recognized the S-SFH change cycle, the MS decodes the P-SFH IE whenever a validity check of S-SFH SP IEs stored in the MS is needed, such that the S-SFH change count field value of the P-SFH SP IE may be compared with the S-SFH change count stored in the MS.

Provided that the S-SFH change count is changed only in specific superframes that are decided according to the change cycle and the SFN, the MS may calculate a superframe where the S-SFH change count can be changed using the SFN and the S-SFH change cycle.

The MS operating in a normal mode decodes the P-SFH IE in the calculated superframe, such that it can recognize whether the S-SFH SP IEs are changed.

If the calculated superframe is contained in the sleep window, the MS operating in a sleep mode can receive the P-SFH IE at a superframe via which a P-SFH including the S-SFH change count changed is transmitted just before the listening window. For example, provided that superframes (z and z+n) that are capable of changing the S-SFH change count are contained in the sleep window, the MS operates in a superframe 'z+n' without operating in a superframe 'z' such that it can receive P-SFH IE. If the calculated superframe is not contained in the sleep window, the MS need not be operated because the BS can change the S-SFH IE only once within the above-mentioned change cycle. That is, this means that the S-SFH IE remains unchanged while the MS stays in the sleep window.

In addition, the MS receives the S-SFH SP IE and updates it at step S230.

If the value of the S-SFH change count field of the P-SFH SP IE is different from the S-SFH change count stored in the MS, the MS receives at least one of the S-SFH SP IEs, and updates the received S-SFH SP IE. Otherwise, if the value of the S-SFH change count field of the P-SFH SP IE is identical to the S-SFH change count stored in the MS, the MS does not decode the S-SFH SP IE before the value of the S-SFH change count is changed to another value.

If a difference between a value of the S-SFH change count field of the P-SFH SP IE and the S-SFH change count value stored in the MS is 1, the MS receives only the S-SFH SP IE where a bit of the S-SFH SP change bitmap of the P-SFH SP IE is set to 1, and updates the received S-SFH SP IE. The S-SFH SP change bitmap indicates whether each S-SFH SP IE is changed. That is, provided that the S-SFH SP change bitmap field is 'XYZ', 'Z' may indicate whether S-SFH SP1 is changed, 'Y' may indicate whether S-SFH SP2 is changed, and 'X' may indicate whether S-SFH SP3 is changed. For example, if 'Z' is set to '1', 'Z=1' means that S-SFH SP1 is changed. If 'Z' is set to '0', 'Z=0' means that S-SFH SP1 remains unchanged. If 'Y' is set to '1', 'Y=1' means that S-SFH SP2 is changed. If 'Y' is set to '0', 'Y=0' means that S-SFH SP2 remains unchanged. If 'X' is set to '1', 'X=1' means that S-SFH SP3 is changed. If 'X' is set to '0', 'X=1' means that S-SFH SP3 remains unchanged.

If a difference between the value of the S-SFH change count field of the P-SFH SP IE and the S-SFH change count value stored in the MS is higher than '1', the MS receives and updates all the S-SFH SP IEs.

The MS applies content contained in the changed S-SFH SP IE after a specific time point at step S240.

If the S-SFH SP IE is changed, the BS and the MS may apply content including the changed S-SFH SP IE after a specific time point.

The embodiments of the present invention provide six methods that decide a specific time point at which content contained in the changed S-SFH SP IE is applied.

First, a first method that decides a specific time point at which content contained in the changed S-SFH SP IE is applied will hereinafter be described in detail. In accordance with a first method, content contained in the changed S-SFH SP IE begins from a specific superframe decided by a superframe having the changed S-SFH SP IE. That is, after the changed S-SFH SP IE is regularly scheduled a predetermined number of times from the superframe decided by the above-mentioned calculation method, content contained in the changed S-SFH SP IE may be applied to the next superframe, such that a predetermined time in which each MS can receive the changed S-SFH SP IE can be guaranteed. In this case, the predetermined number of times may be preset to a fixed value, or may be dynamically decided by the BS.

For example, provided that S-SFH SP1 IE is changed, after the S-SFH change count field is increased by one in a superframe decided by the above-mentioned calculation method, and the changed S-SFH SP1 IE is regularly scheduled two times, content contained in the changed S-SFH SP IE may be applied to the next superframe. Provided that S-SFH SP2 IE is changed, after the S-SFH change count field is increased by one in a superframe decided by the above-mentioned calculation method, and the changed S-SFH SP2 IE is regularly scheduled two times, content contained in the changed S-SFH SP IE may be applied to the next superframe. In addition, provided that S-SFH SP3 IE is changed, after the S-SFH change count field is increased by one in a superframe decided by the above-mentioned calculation method, and the changed S-SFH SP3 IE is regularly scheduled once, content contained in the changed S-SFH SP IE may be applied to the next superframe.

If several S-SFH SP IEs are changed in one S-SFH change cycle, information contained in the changed S-SFH SP IEs is simultaneously applied to the last superframe among predetermined superframes for respective S-SFH SP IEs. That is, after individual S-SFH SP IEs are regularly scheduled a predetermined number of times for individual S-SFH SP IEs, and the scheduled S-SFH SP IEs are transmitted, information contained in several S-SFH SP IEs is simultaneously applied to the latest superframe among subsequent superframes.

In addition, the BS includes the S-SFH application hold indicator in a P-SFH, and transmits the resultant P-SFH to the MS. The S-SFH application hold indicator may indicate whether content of S-SFH SP IEs associated with the S-SFH change count is applied to a current superframe. In other words, if the S-SFH application hold indicator is set to zero '0', the S-SFH application hold indicator of 0 indicates that content of S-SFH SP IEs associated with the S-SFH change count contained in a P-SFH transmitted in a current superframe is applied to the current superframe. In contrast, if the S-SFH application hold indicator is set to '1', this means that content of S-SFH SP IEs associated with an expression ('S-SFH change count contained in the P-SFH transmitted in the current superframe'−1) can be applied to the current superframe.

FIG. 3 shows application time points when one S-SFH SP IE is changed in one transmission time interval according to the present invention.

As can be seen from FIG. 3, provided that the S-SFH change cycle is set to 16, after S-SFH SP1 IE is changed and the S-SFH change count field is increased by one in a superframe decided by the above-mentioned calculation method, the changed S-SFH SP1 IE is transmitted two times, and then content contained in the changed S-SFH SP1 IE may be applied to the next superframe.

In FIG. 3, 'CC' indicates the S-SFH change count, 'CB' indicates the S-SFH SP change bitmap, 'SI' indicates S-SFH scheduling information, 'CB' indicates the S-SFH SP change bitmap, and 'SI' indicates S-SFH scheduling information, and 'Flag' indicates the S-SFH application hold indicator. The above-mentioned parameters are contained in the P-SFH IE, and are then transmitted. Although the S-SFH count indicates the S-SFH change count associated with S-SFH SP IEs applied to the corresponding superframe, the S-SFH count need not be contained in the P-SFH IE.

In FIG. 3, in a superframe having an SFN decided by the above-mentioned calculation method, the S-SFH change count is changed from 0 to 1, the S-SFH SP change bitmap is set to '001' so as to indicate the changed S-SFH SP1 IE. In addition, the changed S-SFH SP1 IE is transmitted via each superframe having an SFN of 17 or 19. In addition, content of the changed S-SFH SP1 IE is applied to superframes starting from a superframe having an SFN of 20.

FIG. 4 shows application time points when several S-SFH SP IEs are changed in one transmission time interval.

As can be seen from FIG. 4, provided that the S-SFH change cycle is set to 16, S-SFH SP1 IE and S-SFH SP2 IE are changed after the S-SFH change count field is increased by one in a superframe decided by the above-mentioned calculation method. After the changed S-SFH SP1 IE is transmitted two times and the next superframe and the changed S-SFH SP2 IE are then transmitted two times, contents of the changed S-SFH SP1 IE and S-SFH SP2 IE are simultaneously applied in the range from the latest superframe among subsequent superframes.

In FIG. 4, in a superframe having an SFN decided by the above-mentioned calculation method, the S-SFH change count is changed from 0 to 1, and the S-SFH SP change bitmap is set to '011', '011' indicating that the S-SFH SP1 IE and the S-SFH SP2 IE are changed. In addition, the changed S-SFH SP1 IE is transmitted via each superframe having an SFN of 17 or 19, and the changed S-SFH SP2 IE is transmitted via each superframe having an SFN of 18 or 22. Therefore, a superframe, that is located just after the changed S-SFH SP1 IE has been transmitted two times, is a superframe having an SFN of 20, and a superframe, that is located just after the changed S-SFH SP2 IE is transmitted two times, is a superframe having an SFN of 23. Therefore, contents of the changed S-SFH SP1 IE and S-SFH SP2 IE may be applied after the later one of the superframe having an SFN of 20 and another superframe having an SFN of 23.

Next, a second method of deciding a specific time point at which content contained in the changed S-SFH SP IE is applied will hereinafter be described in detail. In accordance with the second method, the BS informs MSs whether S-SFH SP IEs are changed at a specific reference time point, and informs each MS of the application time point using the flag. In addition, the changed S-SFH SP1 IEs are applied to an application time point indicated through the flag.

A specific reference point may be superframes that satisfy SFN mod x=0. In this case, if the S-SFH change cycle is represented in a time unit (e.g., ms), 'x' is denoted by (S-SFH change cycle/20 ms). If the S-SFH change cycle is represented by a total number of S-SFH SP IEs that can be transmitted during the S-SFH change cycle, 'x' is denoted by (S-SFH change cycle*S-SFH SP IE change cycle*S-SFH SP IE transmission period/20). If the S-SFH change cycle is represented in units of a superframe, 'x' is an S-SFH change cycle.

Table 4 shows a flag for use in the second method under the condition that the S-SFH change cycle is represented by a total number of S-SFH SP IEs that can be transmitted during the S-SFH change cycle.

TABLE 4

| Flag | Description |
| --- | --- |
| 00 | Application in current superframe |
| 01 | Application from specific point spaced apart from specific reference point by {(change cycle * S-SFH SP1 IE transmission period/20 ms)/4} |
| 10 | Application from specific point spaced apart from specific reference point by {(change cycle * S-SFH SP1 IE transmission period/20 ms)/2} |
| 11 | Application from specific point spaced apart from specific reference point by {(change cycle * S-SFH SP1 IE transmission period/20 ms) − 1} |

FIG. 5 shows application time points according to a second method.

In FIG. 5, the S-SFH change cycle is composed of 32 superframes.

In FIG. 5, a specific reference point is set to superframes having SFNs of 32 and 64, the S-SFH change count is changed to '1' in a superframe having an SFN of 32, and the S-SFH change bitmap is set to '011', indicating that the S-SFH SP1 IE and the S-SFH SP2 IE are changed. In addition, since the flag is set to '10', contents of the changed S-SFH SP1 IE and S-SFH SP2 IE are applied in the range from a 48-day superframe corresponding to an SFN indicating a specific position spaced apart from a specific reference point by 16 superframes.

In a superframe having an SFN of 64, the S-SFH change count is changed to '2', and the S-SFH SP change bitmap is set to '001', indicating that S-SFH SP1 IE is changed. In addition, since the flag is set to '01', content of the changed S-SFH SP1 IE is applied from a superframe having an SFN of 72, the superframe corresponding to a specific position spaced apart from a specific reference point by 8 superframes.

If the MS having the stored S-SFH change count of 0 receives the S-SFH change count of 1 through the P-SFH, the MS can recognize that the S-SFH SP IE is changed. Since a difference between the S-SFH change count stored in the MS and the other S-SFH change count received through P-SFH is '1', the MS can recognize that S-SFH SP1 IE and S-SFH SP2 IE are changed by recognizing the S-SFH change bitmap. Therefore, at transmission time points of the S-SFH SP1 IE and the S-SFH SP2 IE, the MS receives the changed S-SFH SP1 IE and S-SFH SP2 IE. In addition, the MS checks the flag such that it can recognize application time points of the changed S-SFH SP1 IE and S-SFH SP2 IE.

If the MS having the stored S-SFH change count of 0 receives the S-SFH change count of 2 through the P-SFH, the MS can recognize that the S-SFH SP IE has been changed. Since a difference between the S-SFH change count stored in the MS and the other S-SFH change count received through a P-SFH is denoted by 2, the MS has to receive all the S-SFH SP IEs. In addition, the MS recognizes the S-SFH change bitmap such that it can recognize that S-SFH SP IE changed in the corresponding S-SFH change cycle is identical to S-SFH SP1 IE. The MS uses a flag to recognize an application time point of the changed S-SFH SP1 IE, and can also recognize that S-SFH SP2 IE and S-SFH SP3 IE have already been applied.

Next, a third method of deciding a specific time point at which content contained in the changed S-SFH SP IE is applied will hereinafter be described in detail. In accordance with a third method, the BS informs MSs whether each S-SFH SP IE is changed within the S-SFH change cycle, and also informs each MS of an application time point using a flag. The changed S-SFH SP IEs are simultaneously applied to an application time point indicated through a flag. In this case, information about whether each S-SFH SP IE is changed may be transmitted to MSs in a superframe that initially receives each S-SFH SP IE within the S-SFH change cycle.

A specific reference point is determined in the same manner as in the second method, and the flag serves the same purpose as in Table 4.

FIG. 6 shows exemplary application time points according to a third method.

In FIG. 6, the S-SFH change cycle is composed of 32 frames.

In FIG. 6, a specific reference point is set to superframes having SFNs of 32 and 64, the S-SFH change count is changed to '1' in a superframe having an SFN of 33 via which the changed S-SFH SP1 IE is initially transmitted within the S-SFH change cycle, and the S-SFH change bitmap is set to '001', indicating that the S-SFH SP1 IE is changed. In addition, in a superframe having an SFN of 34 via which the changed S-SFH SP2 IE is initially transmitted within the S-SFH change cycle, the S-SFH change count is changed to 2, and the S-SFH SP change bitmap is set to '010', indicating that the S-SFH SP2 IE is changed. In addition, since the flag is set to '10', contents of the changed S-SFH SP1 IE and the S-SFH SP2 IE are applied in the range from a specific position spaced apart from a specific reference point by 16 superframes.

The MS operating in the sleep mode can recognize whether each of S-SFH SP1 IE, S-SFH SP2 IE 2 and S-SFH SP3 IE is changed at a specific position where each of S-SFH SP1 IE, S-SFH SP2 IE and S-SFH SP3 IE is initially transmitted within a previous listening window. For example, the MS that has a listening window corresponding to an SFN of 43 can recognize whether the S-SFH SP3 IE is changed at a superframe of 32, can recognize whether the S-SFH SP1 IE is changed at a superframe of 33, and can recognize whether the S-SFH SP2 IE is changed at a superframe of 34. The MS can recognize that S-SFH SP1 IE and S-SFH SP2 IE 2 are changed. In addition, the MS can recognize that contents of the changed S-SFH SP1 IE and S-SFH SP2 IE are applied in the range from a specific position spaced apart from a specific reference point by 16 superframes.

FIG. 7 shows another example of an application time point according to a third method.

In FIG. 7, the S-SFH change cycle is composed of 32 superframes.

In FIG. 7, if the S-SFH change count is increased within one S-SFH change cycle, only a bit corresponding to the changed S-SFH SP IE of the S-SFH SP change bitmap is set to 1. In addition, if the S-SFH change count is increased in the corresponding S-SFH change cycle, a bit corresponding to the changed S-SFH SP IE of the S-SFH SP change bitmap is additionally set to '1'.

In FIG. 7, provided that S-SFH SP1 IE is changed in a superframe having an SFN of 5, the S-SFH SP change bitmap is set to '001'. In addition, provided that the S-SFH SP2 IE is changed in a superframe having an SFN of 10, the S-SFH SP change bitmap is set to '011'.

Next, a fourth method of deciding a specific time point at which content contained in the changed S-SFH SP IE is applied will hereinafter be described in detail. In accordance with the fourth method, a flag may be interpreted in different ways according to superframes. Content contained in the changed S-SFH SP IE may be simultaneously applied according to the corresponding flag values.

Table 5 shows different meanings of a flag according to a fourth method.

TABLE 5

| Flag | Flag meaning in superframe where the changed SP is not transmitted | Flag meaning in superframe where the changed SP is transmitted |
|---|---|---|
| 00 | S-SFH count is applied in current superframe | Application in current superframe |
| 01 | (S-SFH count − 1) is applied in current superframe | Application from specific position spaced apart from specific reference point by {(change cycle * SP1 period information/20 ms)/4} |
| 10 | (S-SFH count − 2) is applied in current superframe | Application from specific position spaced apart from specific reference point by {(change cycle * SP1 period information/20 ms)/2} |
| 11 | (S-SFH count − 3) is applied in superframe | Application from specific position spaced apart from specific reference point by {(change cycle * SP1 period information/20 ms) − 1} |

In the case where the S-SFH change count is initially increased in one S-SFH change cycle, only a bit corresponding to the changed S-SFH SP IE of the S-SFH SP change bitmap is set to '1'. In addition, if the S-SFH change count is increased in the corresponding S-SFH change cycle, a bit corresponding to the currently changed S-SFH SP IE of the S-SFH SP change bitmap is additionally set to '1'.

Figure 8:
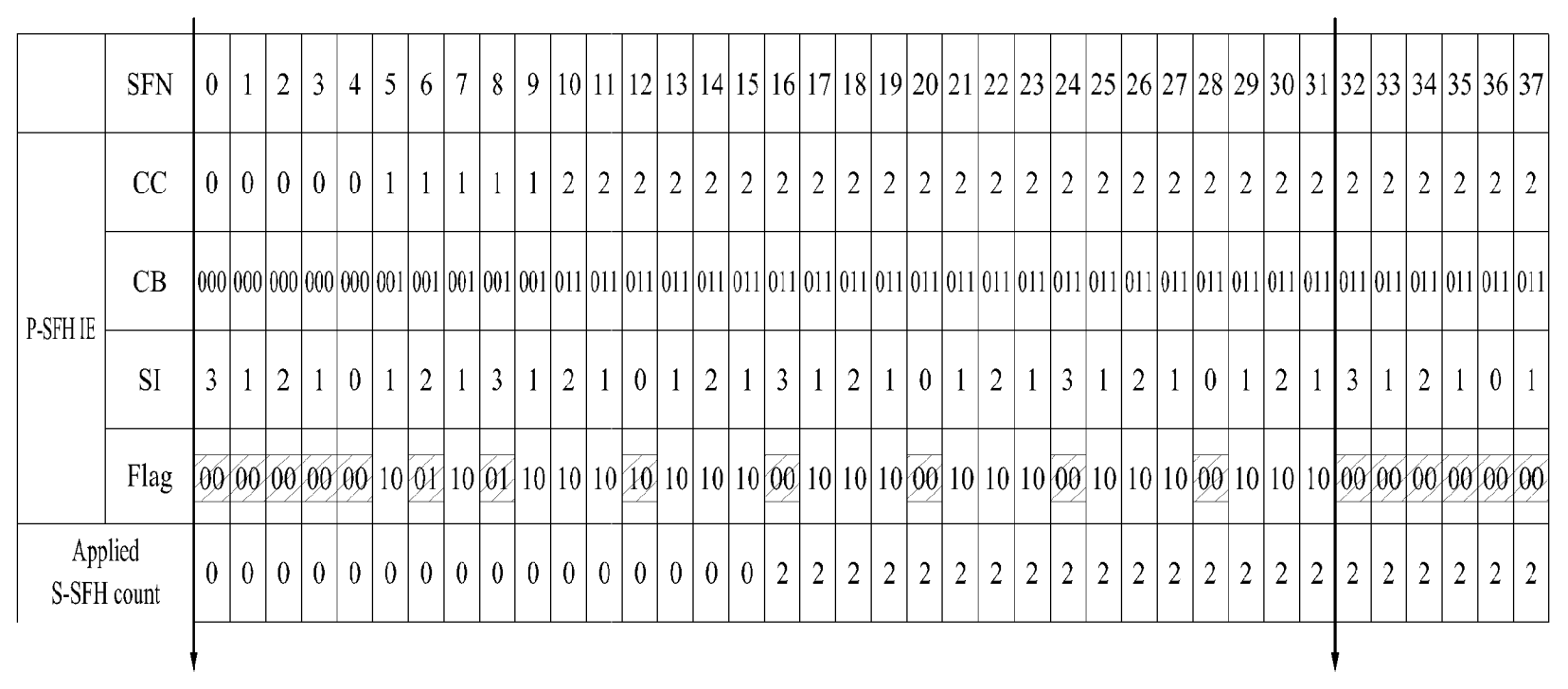

FIG. 8 shows application time points according to a fourth method.

In FIG. 8, the S-SFH change cycle is composed of 32 superframes.

In FIG. 8, provided that S-SFH SP1 IE is changed in a superframe having an SFN of 5, the S-SFH SP change bitmap is set to '001'. Provided that S-SFH SP2 IE is changed in a superframe having an SFN of 10, the S-SFH SP change bitmap is set to '011'. In addition, since the flag is set to '10', contents of the changed S-SFH SP1 IE and S-SFH SP2 IE are applied in the range from a specific position spaced apart from a specific reference point by 16 superframes.

If the SFN of the current superframe is larger than an SFN of the application time point indicated by the flag, this means that the changed S-SFH SP IE has already been applied.

A flag of a superframe via which the S-SFH SP IE that causes the S-SFH change count to be increased in one S-SFH change cycle may indicate an application time point of the S-SFH SP IE. In addition, a superframe via which the remaining S-SFH SP IEs are transmitted and a flag of a superframe via which the S-SFH SP IE is not transmitted may indicate the S-SFH change count associated with the S-SFH SP IEs currently applied in the current superframe.

In FIG. 8, the oblique part may indicate superframes that indicate the S-SFH change count related to the S-SFH SP IEs currently applied to the current superframe.

Provided that the S-SFH change cycle is changed, a flag indicates the S-SFH change count related to the S-SFH SP IEs currently applied to the current superframe before the S-SFH change count is increased.

Next, a fifth method of deciding a specific time point at which content contained in the changed S-SFH SP IE is applied will hereinafter be described in detail. In accordance with the fifth method, a flag may be interpreted in different ways according to superframes. The BS informs MSs whether each S-SFH SP IE is changed at a superframe via which each of the changed S-SFH SP IEs is transmitted in the S-SFH change cycle, and informs each MS of the application time point using the flag. In addition, each changed S-SFH SP IE is independently applied at an application time point indicated by each flag value.

In the fifth method, a specific reference point is decided in the same manner as in the second method.

In the case where the S-SFH change count is increased in one S-SFH change cycle, only a bit corresponding to the changed S-SFH SP IE of the S-SFH SP change bitmap is set to '1'. In addition, if the S-S-SFH change count is increased in the corresponding S-SFH change cycle, a bit corresponding to the currently changed S-SFH SP IE of the S-SFH SP change bitmap is additionally set to '1'.

FIG. 9 shows one example of an application time point according to a fifth method. Refer to Table 5 for the flag meaning. FIG. 10 shows another example of an application time point according to a fifth method. The flag meanings refer to Table 6.

Table 6 shows the meanings of flags shown in FIG. 10 according to the fifth method.

TABLE 6

| Flag | Flag meaning in superframe where the changed SP is not transmitted | Flag meaning in superframe where the changed SP is transmitted |
|---|---|---|
| 00 | S-SFH count is applied in current superframe | All changed SPs are applied to current superframe |
| 01 | (S-SFH count − 1) is applied in current superframe | Application from specific position spaced apart from specific reference point by {(change cycle * SP1 period information/20 ms)/4} |
| 10 | (S-SFH count − 2) is applied in current superframe | Application from specific position spaced apart from specific reference point by {(change cycle * SP1 period information/20 ms)/2} |
| 11 | (S-SFH count − 3) is applied in superframe | Application from specific position spaced apart from specific reference point by {(change cycle * SP1 period information/20 ms) − 1} |

In FIGS. 9 and 10, the S-SFH change cycle is composed of 32 superframes.

In FIGS. 9 and 10, if the S-SFH SP1 IE is changed in a superframe having an SFN of 5, the S-SFH SP change bitmap is set to '001'. If the S-SFH SP2 IE is changed in a superframe having an SFN of 10, the S-SFH SP change bitmap is set to '011'.

In addition, if the SFN of the current superframe is greater than an SFN of the application time point indicated by the flag, this means that the changed S-SFH SP IE has already been applied.

A flag of a superframe via which the S-SFH SP UE that causes the S-SFH change count to be increased in one S-SFH change cycle may indicate an application time point of the S-SFH SP IE. In addition, a superframe via which the remaining S-SFH SP IEs are transmitted and a flag of a superframe via which the S-SFH SP IE is not transmitted may indicate the S-SFH change count associated with the S-SFH SP IEs currently applied in the current superframe.

In FIG. 9, the oblique part may indicate superframes that indicate the S-SFH change count related to the S-SFH SP IEs currently applied to the current superframe.

In FIG. 10, after each changed S-SFH SP IE is applied, the flag indicates the S-SFH change count related to the S-SFH SP IEs currently applied to the current superframe. That is, as can be seen from FIG. 10, content of the S-SFH SPE IE is applied in the range from an SFN of 8, and a flag is set to '0' in the range from a superframe where the S-SFH SP1 IE is transmitted from the corresponding SFN. Since content of the changed S-SFH SP2 IE is applied to a superframe having an SFN of 16, all the changed S-SFH IEs are applied, such that all frames are set to zero in the range from a superframe having an SFN of 16.

If the S-SFH change cycle is changed, the flag indicates the S-SFH change count related to the S-SFH SP IEs currently applied to the current superframe before the S-SFH change count is increased.

If a difference between the S-SFH change count stored in the MS and the other S-SFH change count of the received P-SFH is set to '1', the MS receives only the S-SFH SP IE in which the bit of the S-SFH change bitmap is set to '1' and updates the received S-SFH SP IE. If a difference between the S-SFH change count stored in the MS and the other S-SFH change count of the received P-SFH is greater than ' 1', the MS receives and updates all the S-SFH SP IEs.

The MS can recognize an application time point of the changed S-SFH SP1 IE through the flag of a superframe via which S-SFH SP1 IE is transmitted, and can recognize an application time point of the changed SFH SP2 IE through the flag of a superframe via which S-SFH SP2 IE is transmitted. In addition, through a flag of a superframe via which S-SFH SP3 IE is transmitted and a flag of a superframe via which S-SFH SP IE is not transmitted, the MS can recognize whether the S-SFH SP IEs associated with the S-SFH change counts are currently applied to the corresponding superframe.

In FIGS. 9 and 10, since the flag of the superframe via which the changed S-SFH SP1 IE is transmitted is set to '01', content of the changed S-SFH SP1 IE is applied in the range from a superframe having an SFN of 8 spaced apart from a specific reference point by 8 superframes. Since the flag of the superframe via which the changed S-SFH SP2 IE is transmitted is set to '10', content of the changed S-SFH SP2 IE is applied in the range from a superframe having an SFN of 16 spaced apart from a specific reference point by 16 superframes.

S-SFH SP1 IE and S-SFH SP2 IE include permutation information and are associated with each other. Therefore, in the case where a difference between one S-SFH change count stored in the MS and another S-SFH change count of the received P-SFH is larger than '1', the MS must communicate with the BS after confirming all the application time points of S-SFH SP1 IE and S-SFH SP2 IE. That is, although the MS receives the transmitted S-SFH SP1 IE and recognizes that the received S-SFH SP1 IE has already been applied, the MS has to wait a predetermined time to confirm the S-SFH SP2 IE.

Next, a sixth method of deciding a specific time point at which content contained in the changed S-SFH SP IE is applied will hereinafter be described in detail. In accordance with the sixth method, it is assumed that respective S-SFH SP IEs have different S-SFH change cycles.

In accordance with the sixth method, the BS increases the S-SFH change count by one whenever an S-SFH SP IE is changed, and sets a bit corresponding to the changed S-SFH SP IE of the S-SFH SP change bitmap to '1'. In addition, the bit of the S-SFH SP change bitmap corresponding to the S-SFH SP IE applied to the corresponding superframe is set to '0'.

Figure 11:
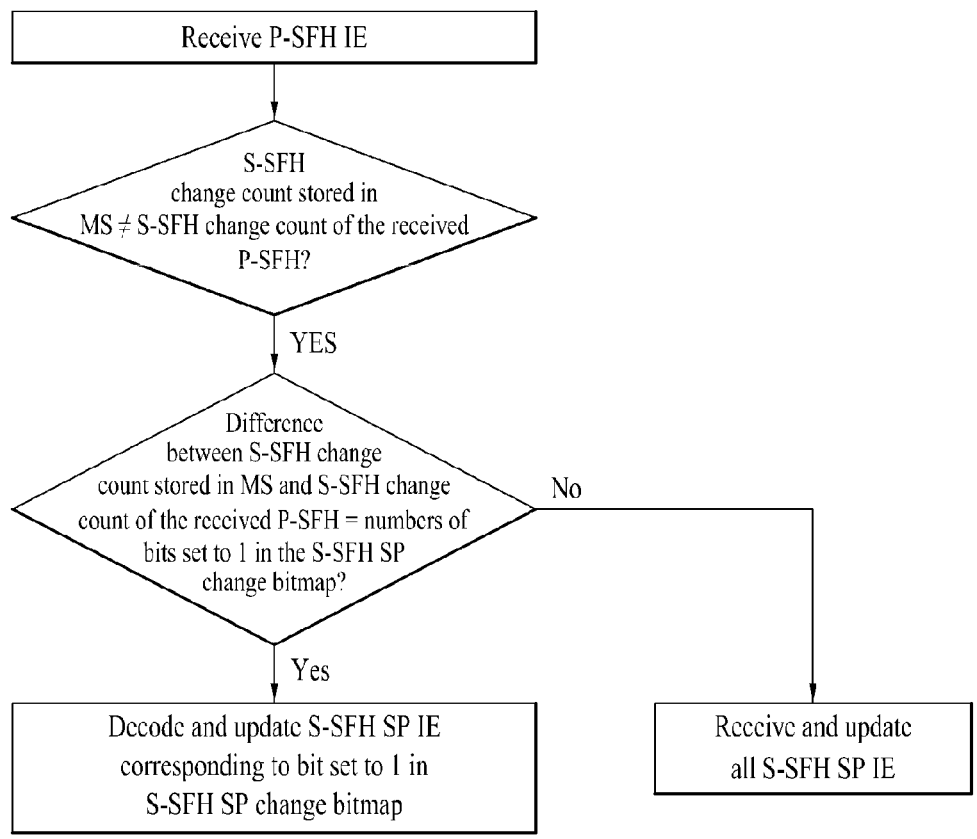
FIG. 11 is a flowchart illustrating operations of a mobile station (MS) according to a sixth method.

FIG. 11 is a flowchart illustrating operations of a mobile station (MS) according to a sixth method.

Referring to FIG. 11, the MS receives the P-SFH, and compares the S-SFH change count stored in the MS with the S-SFH change count of the received P-SFH. If the S-SFH change count stored in the MS is identical to the S-SFH change count of the received P-SFH, the MS need not decode S-SFH SP IEs. If the S-SFH change count stored in the MS is different from the S-SFH change count of the received P-SFH, the MS has to decode S-SFH SP IEs and update the decoded S-SFH SP IEs.

In the case where a difference between the S-SFH change count stored in the MS and the S-SFH change count of the received P-SFH is identical to the number of bits (each of which is set to '1') of the S-SFH SP change bitmap, the MS needs to decode the S-SFH SP IEs corresponding to bits (each of which is set to '1') of the S-SFH SP change bitmap, and then updates the decoded S-SFH SP IEs. In addition, if a difference between the S-SFH change count stored in the MS is different from the S-SFH change count of the received P-SFH is different from the number of bits (each of which is set to '1') of the S-SFH SP change bitmap of the P-SFH, the MS receives and updates all the S-SFH SP IEs. In this case, given that the MS can implicitly recognize the changed S-SFH SP IE using the change cycle, the MS may decode the S-SFH SP IE corresponding to a bit ' 1' of the S-SFH SP change bitmap and the implicitly recognized S-SFH SP IE, and then update it.

The MS recognizes an S-SFH change count and the number of bits (each of which is set to '1') of the S-SFH SP change bitmap, such that it can recognize the S-SFH change count related to the currently-applied S-SFH SP IEs using the recognized result. Provided that the MS has S-SFH SP IEs, it can normally communicate with the BS. Otherwise, provided that the MS does not have S-SFH SP IEs, the MS can normally communicate with the BS after receiving and updating the S-SFH SP IEs.

Figure 12:
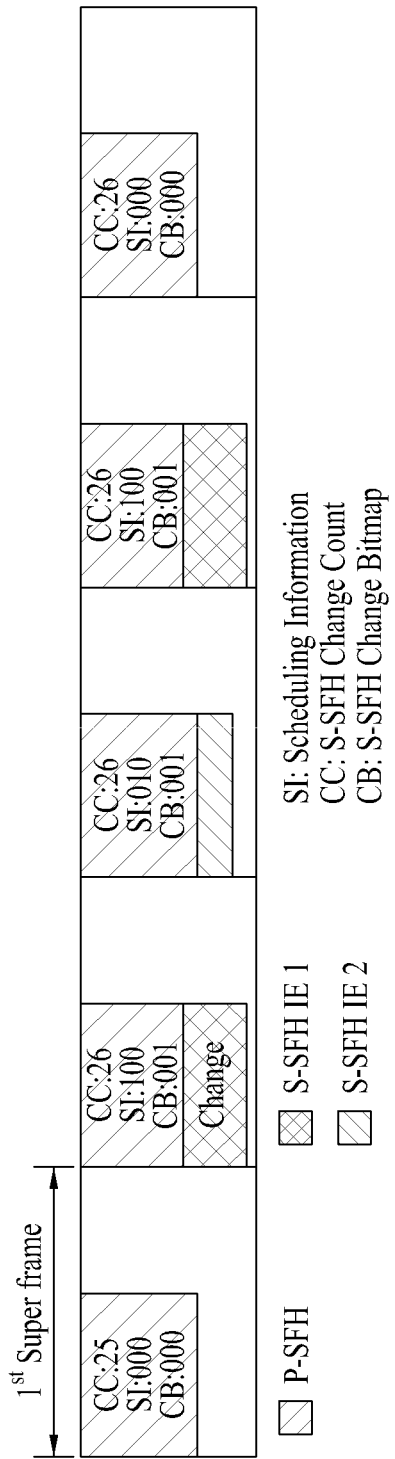
FIG. 12 shows one example of an application time point according to a sixth method.

FIG. 12 shows one example of an application time point according to a sixth method.

In FIG. 12, the BS uses contents of S-SFH SP IEs associated with the S-SFH change count '25' in a first superframe. The S-SFH change count applied to the corresponding superframe may be calculated by an expression 'S-SFH change count−Numbers of bits (each of which is set to '1') of the S-SFH SP change bitmap'. That is, the S-SFH change count applied to a first superframe of FIG. 12 is 25 (i.e., 25−0).

Provided that S-SFH SP1 IE is changed in a second superframe, the BS increases the S-SFH change count up to 26, and the S-SFH SP change bitmap is set to '001'. Therefore, the S-SFH change count applied to each of second, third, and fourth superframes is set to 25 (i.e., 26−1).

In FIG. 12, after the changed S-SFH SP1 IE is transmitted twice, content of the changed S-SFH SP1 IE is applied in the range from the next superframe. In order to guarantee a specific time in which MSs can receive the changed S-SFH SP IE, after the changed S-SFH SP IE is transmitted at least a predetermined number of times, content of the changed S-SFH SP1 IE is utilized. In this case, the predetermined number of times may be defined as a predetermined fixed value, and may be dynamically decided by the BS. Therefore, content of the changed S-SFH SP1 IE is applied to a fifth superframe.

In addition, the BS sets a bit corresponding to the changed S-SFH SP IE of the S-SFH SP change bitmap to '0' at an application time point of the changed S-SFH SP IE, such that the S-SFH SP change bitmap is set to '000' in the fifth superframe.

In FIG. 12, it is assumed that the S-SFH change count stored in the MS in a first superframe is set to 25. The MS recognizes the S-SFH change count applied to a first superframe using not only the S-SFH change count of the first superframe but also the number of bits (each of which is set to '1') of the S-SFH SP change bitmap.

The MS compares the S-SFH change count received via the first superframe with the S-SFH change count stored in the MS. If the S-SFH change count received via the first superframe is identical to the S-SFH change count stored in the MS, this means that the S-SFH SP IEs are not changed. In addition, since the S-SFH change count is 25 and the number of bits (each of which is set to '1') of the S-SFH SP change bitmap is zero, it can be recognized that the S-SFh change count applied to a first superframe is 25.

In the second superframe, the MS recognizes that a difference between the received S-SFH change count and the other S-SFH change count stored in the MS is set to '1', such that the MS can recognize the changed S-SFH SP IE. In addition, the MS can recognize that the S-SFH SP1 IE is changed through the S-SFH SP change bitmap, and can also recognize that the applied S-SFH change count is 25 (i.e., 26–1).

In the fifth superframe, the MS can recognize that the applied count is 26 (i.e., 26–0).

Figure 13:
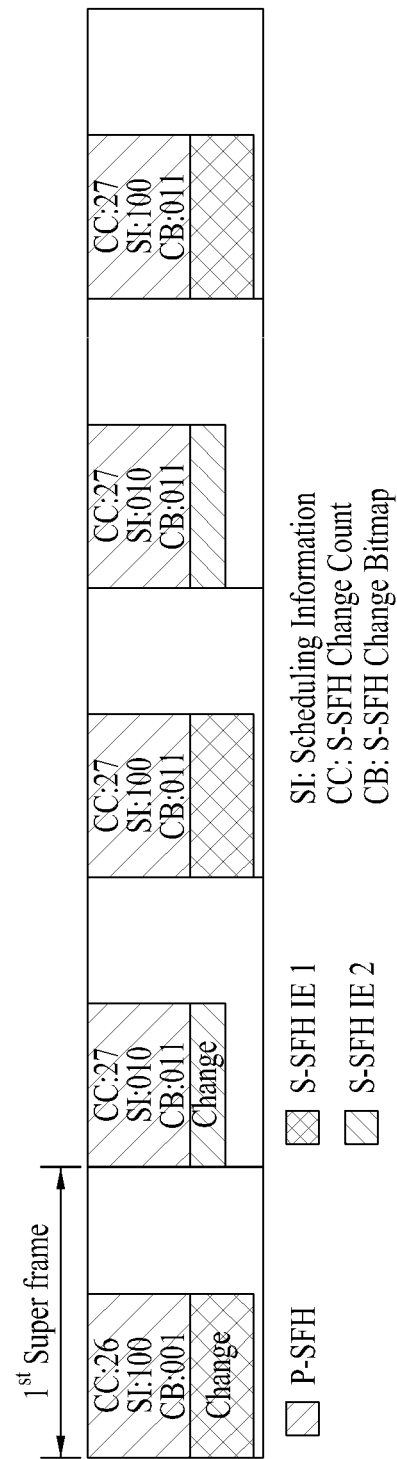
FIG. 13 shows another example of an application time point according to a sixth method.

FIG. 13 shows another example of an application time point according to a sixth method.

In a first superframe, the BS increases the S-SFH change count by one so as to change the S-SFH SP1 IE, such that it sets the S-SFH change count to '26' and the S-SFH SP change bitmap is set to '001'. In addition, the S-SFH change count applied to the first superframe is 25 (i.e., 26–1).

If the S-SFH SP2 IE is changed in the second superframe, the BS increases the S-SFH change count by one such that it sets the S-SFH change count to '27' and sets the S-SFH SP change bitmap to '011'. The S-SFH change count applied to each of the second, third, and fourth superframes is 25 (i.e., 27–2).

If contents of the changed S-SFH SP1 IE and S-SFH SP2 IE are simultaneously utilized, the BS sets the S-SFH SP change bitmap of the fifth superframe to '000'. Therefore, the S-SFH change count applied to the fifth superframe is set to 27 (i.e., 27–0).

Alternatively, the BS may apply contents of the changed S-SFH SP1 IE and S-SFH SP2 IE at different time points as necessary.

Figure 14:
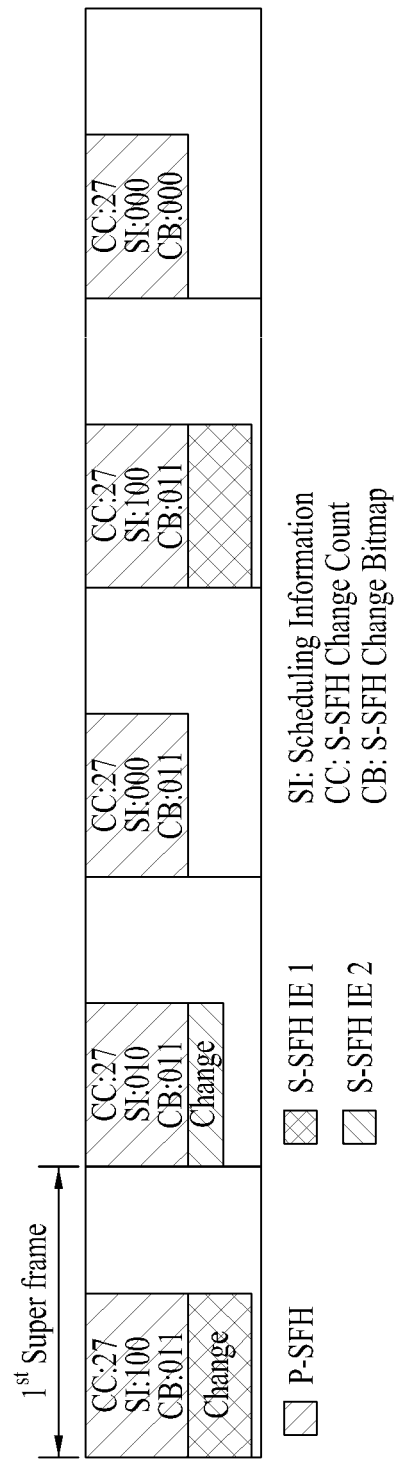
FIG. 14 shows still another example of an application time point according to a sixth method.

FIG. 14 shows still another example of an application time point according to a sixth method.

In the first superframe, the BS increases the S-SFH change count by two so as to change the S-SFH SP1 IE and the S-SFH SP2 IE, such that the S-SFH change count is set to '27' and the S-SFH SP change bitmap is set to '011'. In addition, the S-SFH change count applied to the first superframe is set to 25 (i.e., 27–2).

If contents of the changed S-SFH SP1 IE and S-SFH SP2 IE are simultaneously utilized, the BS sets the S-SFH SP change bitmap to '000' in a fifth superframe. Therefore, the S-SFH change count applied to the fifth superframe is 27 (i.e., 27–0).

The above-mentioned description has disclosed that S-SFH SP IEs are transmitted in the regularly scheduled transmission period. However, the scope or spirit of the present invention is not limited thereto, and the S-SFH SP IEs may also be irregularly transmitted as necessary.

Figure 15:
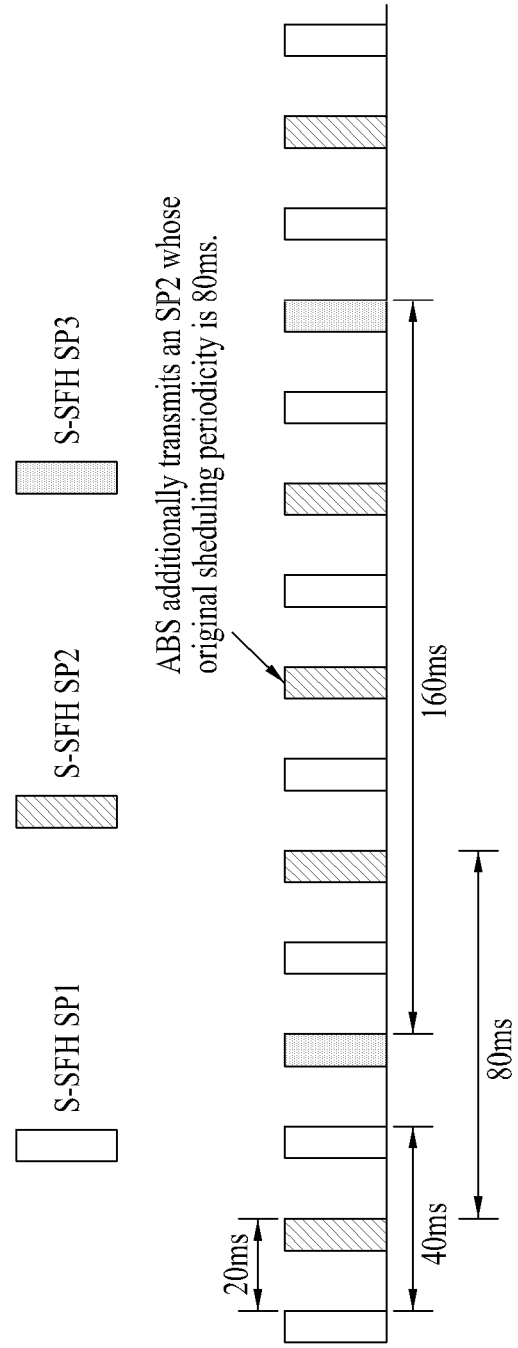
FIG. 15 is a conceptual diagram illustrating that S-SFH SP2 IEs are irregularly transmitted.

FIG. 15 is a conceptual diagram illustrating that S-SFH SP2 IEs are irregularly transmitted.

In this case, the irregularly transmitted S-SFH SP IE may be limited to the changed S-SFH SP IE. In addition, if several S-SFH SP IEs are simultaneously changed, each irregularly transmitted S-SFH SP IEs may be an S-SFH SP IE having the longest transmission period from among several S-SFH SP IEs.

However, the MS may fail to recognize irregular transmission of the S-SFH SP IE.

If the MS does not receive transmission period information through the S-SFH SP3 IE, the MS may implicitly recognize a transmission period from an irregular reception time of the S-SFH SP IE to a reception time of the next S-SFH SP IE. As a result, the MS may erroneously recognize the transmission period of the S-SFH SP IE.

If the MS receives the transmission period information through S-SFH SP3 IE, the MS determines a specific position, that is spaced apart from an irregular reception time point of the S-SFH SP IE by a transmission period, to be a transmission time point of the S-SFH SP IE. Therefore, the MS may erroneously decide the transmission time point of the S-SFH SP IE.

Therefore, the embodiments of the present invention provide the following methods that can prevent the MS from erroneously deciding the S-SFH SP IE transmission period or the S-SFH SP IE transmission time point due to the irregular transmission of the S-SFH IE.

The first method from among the five methods confirms a P-SFH until the MS receives the S-SFH SP IEs having the same transmission period.

The second method allows the BS to explicitly indicate whether S-SFH SP IE is regularly or irregularly transmitted through P-SFH.

The third method allows the BS to explicitly indicate whether S-SFH SP IE is regularly transmitted through each S-SFH SP IE.

In accordance with the fourth method, a specific value (0b1111) from among transmission period information of individual S-SFH SP IEs is adapted to indicate irregular transmission. In this case, the corresponding specific value may be predefined or it is necessary for the BS to inform each MS of the corresponding specific value.

In accordance with the fifth method, a specific value (0b1111) from among S-SFH SP scheduling information transmitted through P-SFH is adapted to indicate irregular transmission.

Two or more methods from among the above-mentioned five methods may be simultaneously utilized as necessary.

The changed S-SFH SP IE may be applied after being transmitted N times in a regular period. In this case, the number of irregular transmissions may be different from N.

In the case where a difference between the S-SFH change count of the MS and the S-SFH change count transmitted through P-SFH is at least 2 and the changed S-SFH SP IE is S-SFH SP3 IE, it is necessary for the MS to explicitly recognize an application time point of the changed information. In other words, since the transmission period may be changed in the changed S-SFH SP3 IE, the MS has to monitor the P-SFH until application time point information transmitted through P-SFJ appears.

Figure 16:
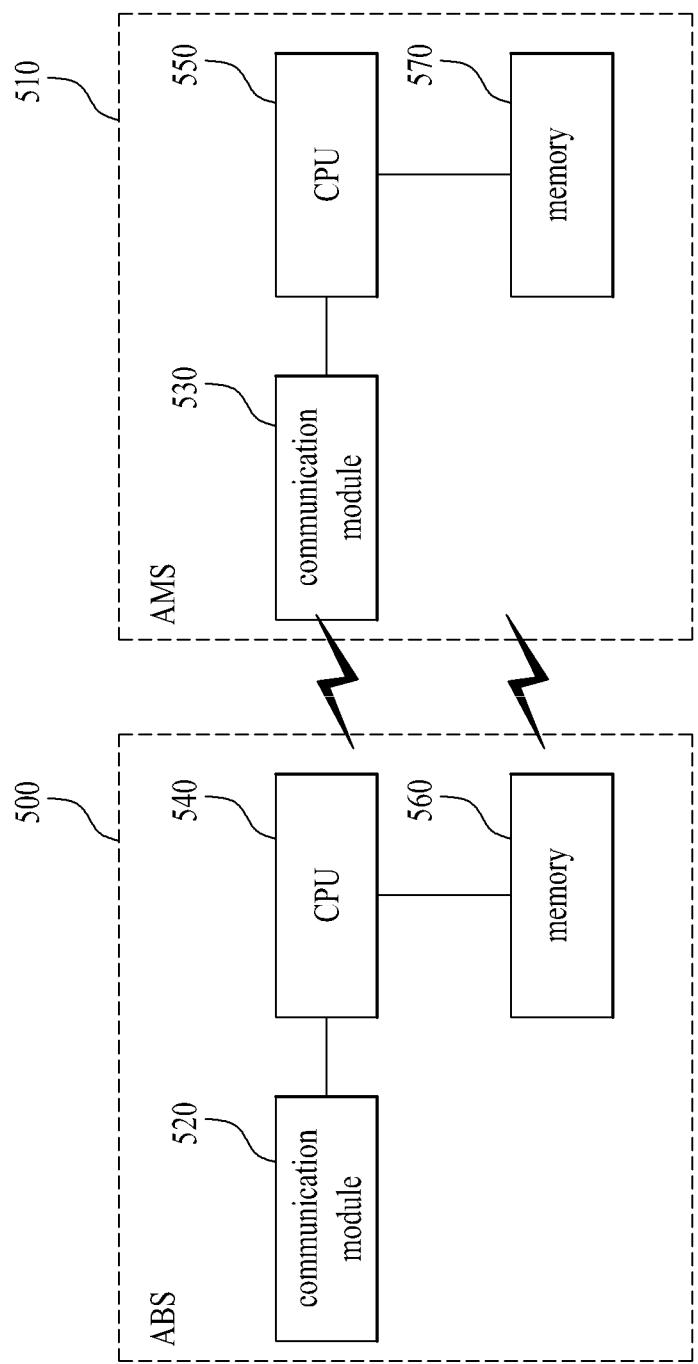
FIG. 16 is a block diagram illustrating an advanced mobile station (AMS) and an advanced base station (ABS) for use in embodiments of the present invention.

FIG. 16 is a block diagram illustrating detailed constituent components of an advanced mobile station (AMS) and an advanced base station (ABS) that can be implemented through the above-mentioned embodiments.

Referring to FIG. 16, each of the AMS 510 and the ABS 500 may include an antenna for transmitting and receiving information, data, signals and/or messages, a communication module 520 or 530 including a Transmission (Tx) module for transmitting messages by controlling the antenna and a Reception (Rx) module for receiving messages by controlling the antenna, a memory 560 or 570 for storing information related to communication, and a central processing unit (CPU) 540 or 550 for controlling the communication module 520 or 530 and the memory 560 or 570.

The CPUs 540 and 550 generally provide overall control to the AMS and the ABS, respectively. Especially, the CPUs 540 and 550 may perform a control function for implementing the above-described exemplary embodiments of the present invention, a variable MAC frame control function based on service characteristics and a propagation environment, a handover function, an authentication and encryption function, etc. In addition, each of the CPUs 540 and 550 may include an encryption module for controlling encryption of various messages and a timer module for controlling transmission and reception of various messages.

If the S-SCH change count of the P-SFH IE is different from the S-SFH change count stored in the MS, the CPU 550 of the AMS receives at least one S-SFH SP IE from among several S-SFH SP IEs, and updates it.

The transmission (Tx) modules may encode and modulate transmission data scheduled by the CPUs according to a predetermined coding and modulation scheme and provide the modulated data to the antennas. The reception (Rx) modules may recover original data by demodulating and decoding data received through the antennas and provide the recovered data to the CPUs.

The Tx module of the ABS 500 transmits P-SFH IE including a first field to the AMS. In this case, the first field includes the S-SFH change cycle and the change count of several S-SFH SP IEs.

The Rx module of the AMS 510 receives P-SFH IE including a first field from the ABS, wherein the first field includes the S-SFH change cycle and the change count of several S-SFH SP IEs.

The memories may store programs for processing and control of the CPUs and temporarily store input/output data (on the side of the AMS, an uplink grant received from the ABS, system information, a station identifier (STID), a flow identifier (FID), an action time, and the like).

Each of the memories may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The exemplary embodiments of the present invention are applicable to various wireless access systems.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

Exemplary embodiments of the present invention have the following effects. If each of several S-SFH SP IEs is changed once, each S-SFH SP IE remains unchanged during one or more S-SFH change cycles, such that the embodiments of the present invention decode the P-SFH IE only when a validity check of each S-SFH SP IE is needed, and recognize whether each S-SFH SP IE is changed on the basis of the decoded result, resulting in a reduction in MS power consumption.

It will be appreciated by persons skilled in the art that that the effects that can be achieved through the present invention are not limited to what has been particularly described hereinabove and other advantages of the present invention will be more clearly understood from the following detailed description taken in conjunction with the accompanying drawings.

What is claimed is:

1. A method for receiving system information by a mobile station (MS) of a wireless communication system, the method comprising:

receiving a secondary superframe header (S-SFH) change cycle from a base station (BS); and receiving a primary superframe header information element (P-SFH IE) including a first field indicating a change count of a plurality of secondary superframe header subpacket information elements (S-SFH SP IEs) from the BS, wherein, once each of the plurality of S-SFH SP IEs is changed, each of the plurality of S-SFH SP IEs remains unchanged during one or more S-SFH change cycle periods, and wherein if a difference between a value of the first field and an S-SFH change count stored in the MS is 1, the MS updates an S-SFH SP IE whose bit in an S-SFH change bitmap is set to 1.

2. The method according to claim 1, wherein a value of the first field increases only in a superframe satisfying that a superframe number (SFN) modulo a value of an S-SFH change cycle is a predetermined number.

3. The method according to claim 2, wherein the predetermined number is '0'.

4. The method according to claim 1, wherein the S-SFH change cycle is indicated in S-SFH SP3 IEs.

5. The method according to claim 1, wherein if a difference between a value of the first field and an S-SFH change count stored in the MS is greater than 1, the MS updates all of the plurality of S-SFH SP IEs.

6. The method according to claim 1, wherein the P-SFH IE further includes a second field indicating S-SFH SP IEs applied in a superframe in which the P-SFH IE is transmitted.

7. The method according to claim 1, wherein if a value of the first field is identical to an S-SFH change count stored in the MS, the MS does not decode an S-SFH IE.

8. A mobile station (MS) for use in a wireless communication system, the MS comprising:

a reception (Rx) module for receiving a secondary superframe header (S-SFH) change cycle from a base station (BS), and receiving a primary superframe header information element (P-SFH IE) that includes a first field indicating a change count of a plurality of superframe header subpacket information elements (S-SFH SP IEs) from the BS, wherein, once each of the plurality of S-SFH SP IEs is changed once, each of the plurality of S-SFH SP IEs remains unchanged during one or more S-SFH change cycle periods, and wherein if a difference between a value of the first field and an S-SFH change count stored in the MS is 1, the MS updates an S-SFH SP IE whose bit in an S-SFH change bitmap is set to 1.

* * * * *